(12) United States Patent
Ozawa et al.

(10) Patent No.: US 9,574,154 B2
(45) Date of Patent: Feb. 21, 2017

(54) SHEET WHOSE LUBRICITY IS MAINTAINED UNDER WET CONDITIONS

(75) Inventors: Hitoshi Ozawa, Himeji (JP); Tatsuo Ohtani, Himeji (JP); Yusuke Nishikawa, Himeji (JP)

(73) Assignee: SUMITOMO SEIKA CHEMICALS CO., LTD., Kako-gun, Hyogo (JP)

( * ) Notice: Subject to any disclaimer, the term of this patent is extended or adjusted under 35 U.S.C. 154(b) by 0 days.

(21) Appl. No.: 13/522,150

(22) PCT Filed: Jan. 7, 2011

(86) PCT No.: PCT/JP2011/050209
§ 371 (c)(1),
(2), (4) Date: Sep. 21, 2012

(87) PCT Pub. No.: WO2011/086980
PCT Pub. Date: Jul. 21, 2011

(65) Prior Publication Data
US 2013/0012677 A1 Jan. 10, 2013

(30) Foreign Application Priority Data

Jan. 13, 2010 (JP) .................. 2010-005003
Jan. 20, 2010 (JP) .................. 2010-010137

(51) Int. Cl.
*C08G 18/77* (2006.01)
*B05D 3/00* (2006.01)
(Continued)

(52) U.S. Cl.
CPC ........ *C10M 107/34* (2013.01); *C08G 18/0852* (2013.01); *C08G 18/6674* (2013.01);
(Continued)

(58) Field of Classification Search
CPC .................................................. C08G 18/77
See application file for complete search history.

(56) References Cited

U.S. PATENT DOCUMENTS 3,553,008 A * 1/1971 Reischl et al. ............. 427/246
3,707,521 A 12/1972 De Santis
(Continued)

FOREIGN PATENT DOCUMENTS

CA    2 779 519 A1    7/2011
EP    0 332 261 A1    9/1989
(Continued)

OTHER PUBLICATIONS

International Preliminary Report on Patentability for PCT/JP2011/050209, mailing date of Apr. 19, 2010.
(Continued)

*Primary Examiner* — Jeffrey Washville
(74) *Attorney, Agent, or Firm* — Westerman, Hattori, Daniels & Adrian, LLP

(57) ABSTRACT

The present invention provides a sheet that has excellent lubricity and good touch feeling under wet conditions and suffers from little drop of the lubricity even if the sheet is used repeatedly. In the sheet of the present invention, a layer of modified polyalkylene oxide obtainable by reacting a polyalkylene oxide compound, a diol compound, and a diisocyanate compound together is directly formed on a surface of a substrate.

3 Claims, 2 Drawing Sheets

(51) Int. Cl.
*C10M 107/34* (2006.01)
*C08G 18/08* (2006.01)
*C08G 18/66* (2006.01)
*C08G 18/75* (2006.01)
*C09D 175/04* (2006.01)
*C10M 159/12* (2006.01)

(52) U.S. Cl.
CPC ......... *C08G 18/758* (2013.01); *C09D 175/04* (2013.01); *C10M 159/12* (2013.01); *C10M 2209/1033* (2013.01); *C10N 2250/141* (2013.01)

(56) References Cited

U.S. PATENT DOCUMENTS

| | | | | |
|---|---|---|---|---|
| 3,832,214 | A * | 8/1974 | Wang | ............... B32B 27/00 427/246 |
| 4,487,808 | A | 12/1984 | Lambert | |
| 5,645,882 | A | 7/1997 | Llanos | |
| 6,017,577 | A * | 1/2000 | Hostettler et al. | ........... 427/2.12 |
| 6,605,666 | B1 * | 8/2003 | Scholz et al. | ................ 524/591 |
| 2003/0199644 | A1 * | 10/2003 | Kim et al. | ................... 525/453 |
| 2004/0121158 | A1 * | 6/2004 | Shannon et al. | ............. 428/413 |
| 2011/0009510 | A1 * | 1/2011 | Gotoh | ............... C08G 18/0852 521/88 |

FOREIGN PATENT DOCUMENTS

| | | |
|---|---|---|
| JP | 54-094961 A | 7/1979 |
| JP | 07-188643 A | 7/1995 |
| JP | 09-502632 A | 3/1997 |
| JP | 2003-334419 A | 11/2003 |
| JP | 2004-509207 A | 3/2004 |
| JP | 2004-276241 A | 10/2004 |
| WO | 86/02087 A1 | 4/1986 |
| WO | 97/18904 A1 | 5/1997 |
| WO | 2004/061228 A1 | 7/2004 |
| WO | 2011/081908 A1 | 7/2011 |

OTHER PUBLICATIONS

Written Opinion of the International Searching Authority for PCT/JP2011/050209, mailing date of Apr. 19, 2010.
International Search Report of PCT/JP2011/050209, mailing date Apr. 19, 2011.
Extended European Search Report dated Jul. 4, 2013, issued in European Patent Application No. 11732850.0.
I. Choi et al., "In situ observation of biomolecules patterned on a PEG-modified Si surface by scanning probe lithography", Biomaterials, vol. 27, pp. 4655-4660, (2006), Cited in Extended European Search Report dated Jul. 4, 2013.
Office Action dated Nov. 18, 2016, issued in counterpart Canadian Patent Application No. 2,786,461. (4 pages).

\* cited by examiner

SHEET WHOSE LUBRICITY IS MAINTAINED UNDER WET CONDITIONS

TECHNICAL FIELD

The present invention relates to a sheet whose lubricity is maintained under wet conditions. More particularly, the present invention relates to a sheet containing a layer of modified polyalkylene oxide which is formed directly on a surface of a substrate.

BACKGROUND ART

There has heretofore been proposed a razor blade cartridge in which a water-soluble resin such as polyalkylene oxide has attached to, penetrated with, or dispersed in a part of the razor blade cartridge made of plastic, in order to reduce the resistance between a part of a razor and a face or the like (Patent Document 1).

Moreover, some composites in which mixing of a water-soluble resin and a water-absorbing resin allows the water-absorbing resin to swell and various auxiliary agents to come off upon immersion in water may also be used as a smoother for wet shaving (Patent Document 2).

Furthermore, a polymer composite containing a water-insoluble polymer and a water-sensitive copolymer produced by polymerizing an alkylene oxide monomer with an epoxy functional monomer has been disclosed as a polymer composite to be used for wet shaving instruments, medical instruments, and the like (Patent Document 3).

PRIOR ART DOCUMENTS

Patent Documents

Patent Document 1: JP 54-94961 A
Patent Document 2: JP 9-502632 A
Patent Document 3: JP 2004-509207 A

SUMMARY OF THE INVENTION

Problem to be Solved by the Invention

In the razor blade cartridge disclosed in Patent document 1, the composite disclosed in Patent document 2, and the polymer composite disclosed in Patent document 3, lubricity is imparted to the surfaces of the composites and others utilizing the fact that a water-soluble resin such as polyalkylene oxide is eluted out under wet conditions.

In these products, however, the compatibility of the water-soluble resin with a thermoplastic resin or the like is low, so that the water-soluble resin is merely dotted in the form of clusters on the surface of the composite or the like. Therefore, although they are superior in lubricity at the initial stage, i.e. at the beginning of use, the dotted water-soluble resin is lost as clusters during repetitive use, so that the lubricity will become lost within a short period.

Moreover, since a water-soluble resin such as polyalkylene oxide easily develops cobwebbing or slime under wet conditions, touch feeling tends to be deteriorated.

An object of the present invention is to provide a sheet that has excellent lubricity and good touch feeling under wet conditions and suffers from little drop of the lubricity and the good touch feeling even if the sheet is used repeatedly.

Means for Solving the Problem

The present inventors studied earnestly in order to solve the above-described problem and found that a sheet containing a layer of modified polyalkylene oxide has excellent lubricity and does not lose its lubricity even if the sheet is used repeatedly. Thus, the present inventors have accomplished the present invention.

That is, the present invention relates to a sheet which can maintain excellent lubricity and good touch feeling even if the sheet is used repeatedly. More particularly, the present invention relates to a sheet which comprises a substrate and a layer of modified polyalkylene oxide formed directly on the surface of the substrate. The sheet according to the present invention has a feature in that modified polyalkylene oxide is obtainable by reacting a polyalkylene oxide compound, a diol compound, and a diisocyanate compound together.

The present invention also provides a method for producing a sheet which comprises a substrate and a layer of modified polyalkylene oxide formed directly on the surface of the substrate. The method for producing a sheet according to the present invention has a feature in that the method comprises applying a solution obtained by dissolving modified polyalkylene oxide in a solvent onto the surface of the substrate and drying the applied solution to form the layer of modified polyalkylene oxide.

Effects of the Invention

The sheet according to the present invention will not lose its lubricity and good touch feeling even if used repeatedly and can be used widely for wet shaving instruments represented by razors, medical instruments such as catheters, ship bottom paints, and the like.

MODE FOR CARRYING OUT THE INVENTION

Figure 1:
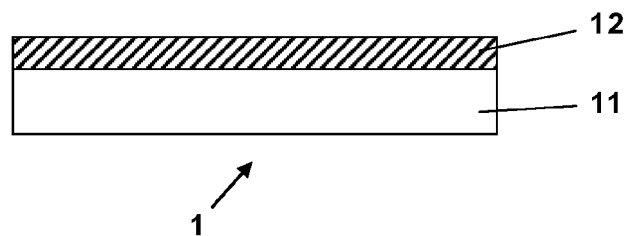
FIG. 1 is a schematic view illustrating a structure of a sheet according to the present invention.

Modified polyalkylene oxide to be used for a sheet according to the present invention is produced by, for example, reacting a polyalkylene oxide compound, a diol compound, and a diisocyanate compound together.

As the polyalkylene oxide compound, polyalkylene oxide compounds each having ethylene oxide groups in an amount of 90% by mass or more are preferred, and polyalkylene oxide compounds each having ethylene oxide groups in an amount of 95% by mass or more are more preferred. If the amount of ethylene oxide groups is less than 90% by mass, the initial lubricity of the resulting sheet may be deteriorated.

As the polyalkylene oxide compound, polyalkylene oxide compounds each having a number average molecular weight of 5,000 to 50,000 are preferred, and polyalkylene oxide compounds each having a number average molecular weight of 10,000 to 30,000 are more preferred. When a polyalkylene oxide compound having a number average molecular weight of less than 5,000 is used, the initial lubricity of the resulting sheet may be deteriorated. When a polyalkylene oxide compound having a number average molecular weight of greater than 50,000 is used, the solubility of resulting modified polyalkylene oxide in a solvent is deteriorated during the production of the sheet according to the present invention and the viscosity of the solution is increased, and therefore the solution may be difficult to apply onto, for example, the surface of a substrate.

Examples of the diol compound include ethylene glycol, diethylene glycol, triethylene glycol, tetraethylene glycol, propylene glycol, dipropylene glycol, trimethylene glycol, 1,3-butanediol, 2,3-butanediol, 1,4-butanediol, 1,5-pentanediol, 1,6-hexanediol, 1,9-nonanediol, and the like. Among these diol compounds, ethylene glycol and 1,4-butanediol are suitably used from the viewpoint of the solubility of resulting modified polyalkylene oxide in a solvent during the production of the sheet according to the present invention and the adhesiveness of a layer of modified polyalkylene oxide onto the substrate. Each of these diol compounds may be used solely or two or more of them may be used in combination.

The ratio of the diol compound used is preferably 1 to 2.5 moles, and more preferably 1.2 to 2.0 moles, per 1 mole of the polyalkylene oxide compound. If the ratio of the diol compound used is less than 1 mole, the lubricity of the sheet may not be maintained when the resulting sheet is used repeatedly. If the ratio of the diol compound used exceeds 2.5 moles, the solubility of the resulting modified polyalkylene oxide in a solvent may be deteriorated. The number of moles of the polyalkylene oxide compound can be determined by dividing the mass thereof by the number average molecular weight thereof.

The diisocyanate compound is not particularly limited as long as the diisocyanate compound is a compound having two isocyanate groups (—NCO) in the same molecule, and examples thereof include 4,4'-diphenylmethane diisocyanate (MDI), 1,6-hexamethylene diisocyanate (HDI), dicyclohexylmethane-4,4'-diisocyanate (HMDI), 3-isocyanatomethyl-3,5,5-trimethylcyclohexyl isocyanate (IPDI), 1,8-dimethylbenzole-2,4-diisocyanate, 2,4-tolylene diisocyanate (TDI), and the like. Among these diisocyanate compounds, dicyclohexylmethane-4,4'-diisocyanate (HMDI) and 1,6-hexamethylene diisocyanate (HDI) are suitably used from the viewpoint of the adhesiveness of a layer of modified polyalkylene oxide onto a substrate during the production of the sheet according to the present invention and the viewpoint of excellent maintenance of the lubricity of the sheet when the resulting sheet is used repeatedly. Each of these diisocyanate compounds may be used solely or two or more of them may be used in combination.

The ratio of the polyalkylene oxide compound, the diol compound and the diisocyanate compound used is determined so that the ratio of the number of moles of the isocyanate groups in the diisocyanate compound to the total number of moles of the terminal hydroxyl groups in the polyalkylene oxide compound and the hydroxyl groups in the diol compound [R value=(the number of moles of —NCO group)/(the number of moles of —OH group)] may preferably fall within the range of 0.6 to 1.5, and more preferably 0.8 to 1.1. If the R value is less than 0.6, resulting modified polyalkylene oxide becomes water-soluble and, therefore, the lubricity of the sheet may not be maintained when the resulting sheet is used repeatedly. If the R value exceeds 1.5, the solubility of resulting modified polyalkylene oxide in a solvent may be poor during the production of the sheet according to the present invention. The number of moles of the polyalkylene oxide compound may be determined by dividing the mass thereof by the number average molecular weight thereof.

Examples of the method for reacting a polyalkylene oxide compound, a diol compound and a diisocyanate compound together include: a method that comprises dissolving or dispersing them in a reaction solvent such as toluene, xylene and dimethylformamide to react them; a method that comprises mixing them uniformly in a powder form or a solid form and then heating to a prescribed temperature to react them, and the like. From the industrial point of view, a method that comprises feeding raw materials continuously in a molten state and mixing and reacting them in a multi-screw extruder is preferable. The temperature to be employed for the reaction is preferably 70 to 210° C.

In the production of modified polyalkylene oxide, from the viewpoint of promoting the reaction, a small amount of triethylamine, triethanolamine, dibutyltin diacetate, dibutyltin dilaurate, stannous octoate, triethylenediamine, or the like may be also added to the reaction system.

As mentioned above, modified polyalkylene oxide can be obtained by reacting the polyalkylene oxide compound, the diol compound and the isocyanate compound together.

It is preferable that modified polyalkylene oxide to be used for the sheet according to the present invention has a melt viscosity of 100 to 800 [Pa·s], and more preferably 150 to 600 [Pa·s], as measured using a flow tester (conditions: 170° C., 5.0 MPa, using a die with diameter 1 mm×length 1 mm). When the melt viscosity is less than 100 [Pa·s], the initial lubricity of the resulting sheet may be deteriorated. When the melt viscosity exceeds 800 [Pa·s], the solubility of modified polyalkylene oxide in a solvent is deteriorated during the production of the sheet according to the present invention and, in addition, the viscosity of the solution is increased and, therefore, the solution may be difficult to apply onto, for example, the surface of a substrate.

It is preferable that modified polyalkylene oxide to be used for the sheet according to the present invention has a water absorption ability of 10 to 40 [g/g], and more preferably 15 to 30 [g/g]. When the water absorption ability is less than 10 [g/g], the solubility of modified polyalkylene oxide in a solvent may be deteriorated during the production of the sheet according to the present invention, and the lubricity of the resulting sheet may also be deteriorated. When the water absorption ability exceeds 40 [g/g], the lubricity of the resulting sheet may not be maintained when it is used repeatedly. In the present invention, the water absorption ability is a value measured by a method mentioned below.

The substrate to be used in the present invention is not particularly limited, and examples thereof include: resins such as polyethylene, polypropylene, polystyrene, high impact polystyrene, an ethylene/(vinyl acetate) copolymer, an ethylene/(acrylic acid) copolymer and nylon; and metals such as SUS and iron. Among these substrates, polystyrene, high impact polystyrene, an ethylene/(vinyl acetate) copolymer, an ethylene/(acrylic acid) copolymer and nylon are suitably used from the viewpoint of obtaining a sheet having excellent adhesiveness to a layer of modified polyalkylene oxide.

Examples of the method for producing a sheet containing the substrate and the layer of modified polyalkylene oxide include: a method comprising applying a solution obtained by dissolving modified polyalkylene oxide in a solvent onto the substrate and drying the applied solution; and a method comprising attaching a layer formed by melting modified polyalkylene oxide and carrying out an inflation method or the like onto the substrate, and the like. In the present invention, from the viewpoint of the adhesiveness of the layer of modified polyalkylene oxide onto the substrate, a method comprising dissolving modified polyalkylene oxide in a solvent, applying the resulting solution onto the substrate, and drying the applied solution is employed. This method is preferred because it is easy to operate, the resulting sheet exhibits excellent lubricity under wet conditions, the lubricity hardly drops, and the touch feeling of the sheet is satisfactory.

The solvent which can dissolve modified polyalkylene oxide is not particularly limited as long as the solvent can dissolve modified polyalkylene oxide. From the viewpoint of the improvement of stability of a solution obtained by dissolving modified polyalkylene oxide in the solvent, the solvent is preferably a mixed solvent of an organic solvent and water.

When modified polyalkylene oxide is dissolved in the solvent, heating may be carried out, if necessary.

Examples of the organic solvent include: alcohols such as methanol, ethanol, isopropyl alcohol and butanol; esters such as ethyl acetate and butyl acetate; ketones such as acetone, methyl ethyl ketone, methyl isobutyl ketone and cyclohexanone; ethers such as cellosolve and tetrahydrofuran; nitrogen-containing organic solvents such as dimethylformamide and triethanolamine; halogenated hydrocarbons such as chloroform and carbon tetrachloride; and aromatic hydrocarbons such as benzene, toluene and xylene. Among these organic solvents, ethanol and isopropyl alcohol are suitably used from the viewpoints of the excellent solubility of modified polyalkylene oxide and excellent compatibility with water. Each of these organic solvents may be used solely or two or more of them may be used in combination.

The mixing ratio of the organic solvent with water is preferably 100 to 1,100 parts by mass, and more preferably 200 to 850 parts by mass, of the organic solvent per 100 parts by mass of water. When the mixing ratio of the organic solvent is less than 100 parts by mass, modified polyalkylene oxide may be hardly dissolved in the solvent. When the mixing ratio of the organic solvent exceeds 1,100 parts by mass, the stability of a solution obtained by dissolving modified polyalkylene oxide in the solvent may be deteriorated during the production of the sheet according to the present invention and, as a result, it may not obtain a uniform layer of modified polyalkylene oxide.

The amount of the solvent used is preferably 150 to 2,500 parts by mass, and more preferably 200 to 2,000 parts by mass, per 100 parts by mass of modified polyalkylene oxide from the viewpoint of the stability of a solution obtained by dissolving modified polyalkylene oxide in the solvent during the production of the sheet according to the present invention and the viewpoint of obtaining a uniform layer of modified polyalkylene oxide. When the amount of the solvent used is less than 150 parts by mass, the solubility of modified polyalkylene oxide in the solvent is deteriorated and the viscosity of the resulting solution is increased and, therefore, the solution may be difficult to apply onto the surface of the substrate. When the amount of the solvent used exceeds 2,500 parts by mass, the lubricity of the sheet may not be maintained when the resulting sheet is used repeatedly.

In the method for producing the sheet according to the present invention, the solution obtained by dissolving modified polyalkylene oxide in the solvent preferably has a viscosity of 50 to 500 [mPa·s], and more preferably 70 to 350 [mPa·s], as measured using a B-type viscometer (conditions: 25° C., rotor No. 2, 6 r/min). When the viscosity of the resulting solution is less than 50 [mPa·s], the lubricity of the sheet may not be maintained when it is used repeatedly. When the viscosity of the solution exceeds 500 [mPa·s], it is difficult to apply the solution onto the surface of the substrate, air is often contained in an application surface, and the surface condition of the resulting sheet is deteriorated and, therefore, touch feeling may be deteriorated.

The solution obtained by dissolving modified polyalkylene oxide in the solvent can be applied onto the surface of the substrate using a roller, a brush, a spray, or the like.

The solution is preferably applied so that the amount of modified polyalkylene oxide dried on the surface of the substrate becomes 1 to 10 [g/m$^2$]. When the amount of modified polyalkylene oxide is less than 1 [g/m$^2$], the lubricity of the resulting sheet may not be maintained when it is used repeatedly. When the amount of modified polyalkylene oxide exceeds 10 [g/m$^2$], the transparency of the layer of resulting modified polyalkylene oxide is decreased and the surface condition of the resulting sheet is deteriorated (e.g., the sheet may be stiff) and, therefore, touch feeling may be deteriorated.

When modified polyalkylene oxide is dissolved in the solvent, a solution-stabilizing agent; a stabilizing agent for the layer of modified polyalkylene oxide, such as an ultraviolet ray absorber; a medically effective component; a pigment for coloring purposes; and the like may be added, if necessary. Modified polyalkylene oxide used in the sheet according to the present invention does not have ionic properties. Therefore, modified polyalkylene oxide is rarely precipitated even in the coexistence of salts or various types of medicinal agents, and the viscosity of the solution is hardly altered.

The method for drying is not particularly limited, and any known drying methods such as drying in the open air, drying by heating and drying under vacuum may be employed.

A schematic cross-sectional view illustrating the structure of the sheet according to the present invention is depicted in FIG. 1. A solution containing modified polyalkylene oxide according to the production method of the present invention is applied onto a surface of a substrate 11, and the applied solution is then dried, whereby a layer 12 of modified polyalkylene oxide is formed directly on the surface of the substrate 11. In this manner, a sheet 1 according to the present invention can be obtained.

EXAMPLES

The present invention will be described in more detail below by way of production examples, examples and comparative examples, but the invention is not limited thereto.
[Evaluation Methods]

The melt viscosities and water absorption abilities of modified polyalkylene oxides mentioned in production examples, the viscosities of solutions obtained by dissolving modified polyalkylene oxides in solvents, and the frictional properties of the sheets obtained in examples and comparative examples were evaluated in accordance with the following methods.
(1) Melt Viscosity of Modified Polyalkylene Oxide 1.5 g of modified polyalkylene oxide was measured using a flow tester (manufactured by SHIMADZU CORPORATION, type No.: CFT-500C) under the following conditions.
   Load: 5.0 MPa
   Measurement temperature: 170° C.
   Diameter of die: 1 mm
   Length of die: 1 mm
(2) Water Absorption Ability of Modified Polyalkylene Oxide The water absorption ability of modified polyalkylene oxide was measured by the following method.

About 1 [g] of modified polyalkylene oxide was weighed precisely (A [g]) and then immersed in 100 [ml] of ion exchange water at room temperature (22° C.) for 24 hours to produce a gel. Then, the gel was collected by filtration through a wire gauze of 200 meshes (pore size: 75 μm) and its mass (B [g]) was measured, followed by the calculation of the water absorption ability (B/A [g/g]) of modified polyalkylene oxide.

(3) Viscosity of Solution Obtained by Dissolving Modified Polyalkylene Oxide in Solvent The viscosity was measured using a B-type viscometer under the following conditions.

Measurement temperature: 25° C.
Rotor: No. 2
Number of revolution: 6 r/min (4) Frictional Properties of Sheet Thirty seconds after the dropping of 0.2 mL of ion exchange water onto the application surface of each of the sheets obtained in examples and the like, a coefficient of friction μ was monitored under the test conditions given below by using a friction tester (manufactured by KATO TECH CO., LTD., type No. KES-SE).

Sensor: silicone
Load: 50 [g]
Speed: 5 [mm/sec]

(i) Mean Coefficient of Friction (MIU)

The MIU has a correlation with the degree of ease of slipping or resistance to slipping when rubbing the surface. The larger the value is, the more difficult the surface is to slip.

Figure 2:
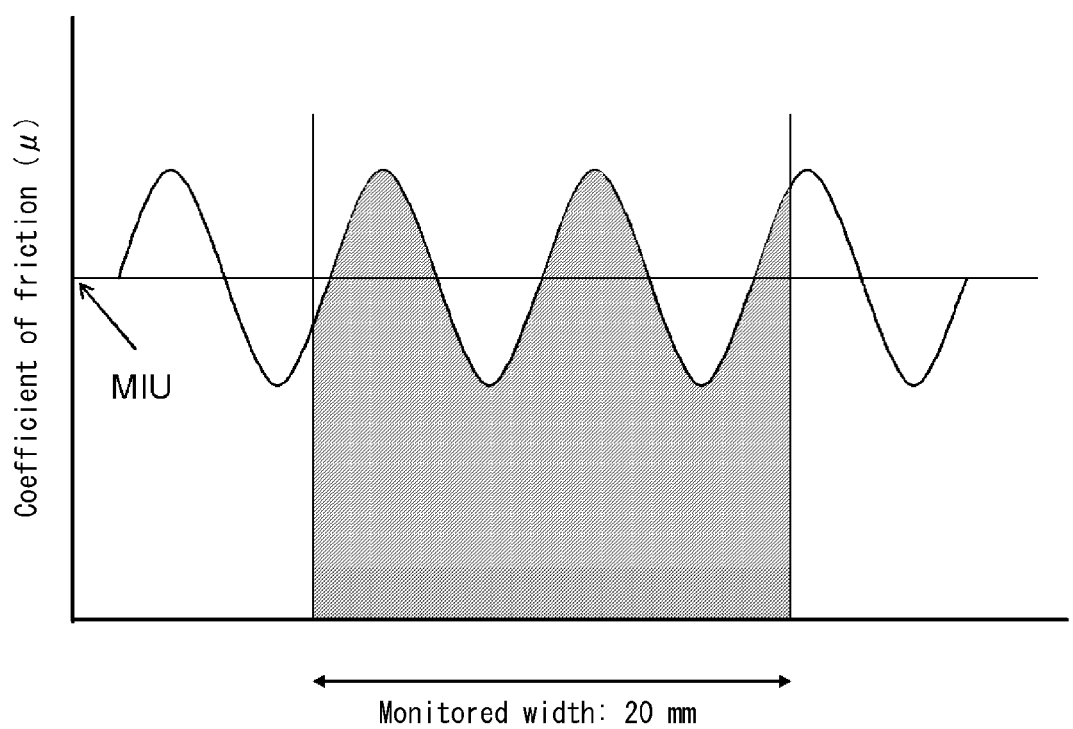
FIG. 2 is a schematic diagram illustrating a method for determining mean coefficient of friction (MIU).

A schematic diagram of determining a mean coefficient of friction (MIU) from the monitored result of the coefficient of friction μ is depicted in FIG. 2.

As illustrated in FIG. 2, the application surface of a sheet is scanned and the coefficient of friction μ of the surface of a layer of modified polyalkylene oxide or the like is monitored. Next, the coefficient of friction μ is integrated within a monitored width of 20 mm (shadow area of FIG. 2). A mean coefficient of friction (MIU) is determined by dividing the integral by the monitored width (20 mm).

When the value of MIU is 0.3 or less, it can be said that the slipping property is good.

(ii) Deviation in Mean Coefficient of Friction (MMD)

The MMD has a correlation with smoothness and roughness felt when rubbing the surface. The larger this value is, the rougher the surface is.

Figure 3:
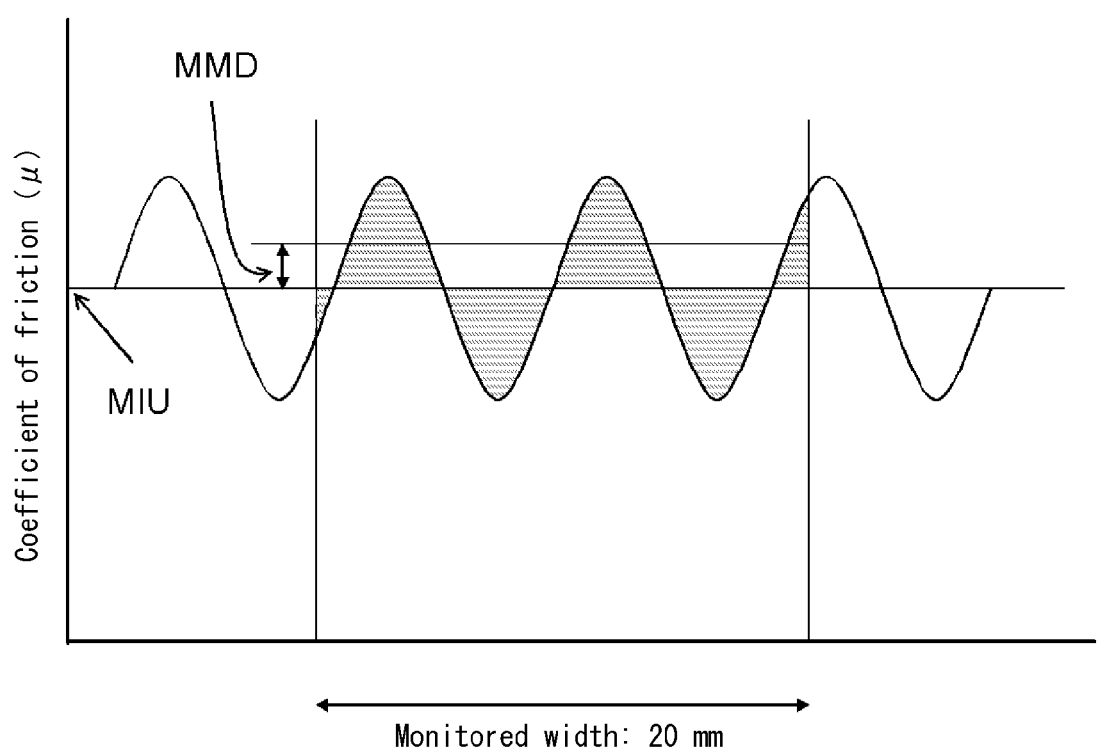
FIG. 3 is a schematic diagram illustrating a method for determining a deviation in mean coefficient of friction (MMD).

A schematic diagram of determining a deviation in mean coefficient of friction (MMD) from the monitored result of the coefficient of friction is depicted in FIG. 3.

As illustrated in FIG. 3, the absolute value of the difference between the mean coefficient of friction (MIU) and the coefficient of friction μ is integrated within a monitored width of 20 mm (shadow area of FIG. 3). The deviation in mean coefficient of friction (MMD) is calculated by dividing the integral by the monitored width (20 mm).

When the value of MMD is 0.015 or less, it can be said that the smoothness of the surface is good.

[1] Repeated Test

After the first monitoring, water on the surface was wiped off with a paper towel and the sheet was dried for 1 hour in an oven set at 50° C., followed by second monitoring under the same conditions as those given above. The same operation was repeated until the sixth times, and the coefficient of friction μ was monitored.

[2] Test Under Running Water (Durability Test)

The sheet after repeating the above-mentioned operation six times was placed for 10 minutes under tap water that flowed from above in the vertical downward direction at a rate of 100 mL/min so that the tilt angle with respect to a horizontal plane became 30°. Then, water on the surface was wiped off with a paper towel, and the coefficient of friction μ was monitored again.

[3] Slimy Feeling

After each of the sheets obtained in examples and the like was immersed in 100 mL of water that was measured in a 200-mL beaker for 1 minute, water on its surface was wiped off with a paper towel, and then the surface of a layer of modified polyalkylene oxide or the like was rubbed by a hand to evaluate in accordance with the following evaluation criteria.

Evaluation Criteria

○: No slimy feeling was felt.
Δ: No cobwebbing occurred but slimy feeling was felt.
x: Slimy feeling was felt and cobwebbing occurred.

Production Example 1

To a storage tank A equipped with a stirrer and held at 80° C. were charged 100 parts by mass of a sufficiently dehydrated polyethylene oxide having a number average molecular weight of 20,000, 0.90 parts by mass of 1,4-butanediol, and 0.1 parts by mass of dioctyltin dilaurate, followed by stirring under a nitrogen gas atmosphere to form a uniform mixture. Apart from this, dicyclohexylmethane-4,4'-diisocyanate was charged to a storage tank B held at 30° C. and was stored under a nitrogen gas atmosphere.

To a twin-screw extruder set at 110 to 140° C. were fed continuously with a metering pump the mixture of the storage tank A at a rate of 500 [g/min] and dicyclohexylmethane-4,4'-diisocyanate of the storage tank B at a rate of 19.4 [g/min] (R value=1.00), mixing and a reaction were carried out in the extruder and then a strand was taken out through the outlet of the extruder and was pelletized by a pelletizer to obtain modified polyalkylene oxide.

Resulting modified polyalkylene oxide had a melt viscosity of 320 [Pa·s] and a water absorption ability of 25 [g/g].

Production Example 2

To a 40 mm-diameter single-screw extruder (L/D=40, preset temperature: 90° C.) were fed ethylene oxide/propylene oxide (mass ratio: 90/10) copolymer having a number average molecular weight of 15,000 at a rate of 250 [g/min] and ethylene glycol heated to 40° C. at a rate of 2.1 [g/min], which were then melt-mixed.

The mixture obtained through a discharging opening (the mixture was discharged in a uniform, molten state and it was confirmed by LC analysis that the materials had been mixed in a charged ratio) was fed continuously to a hopper inlet (set at 80° C.) of a 30 mm-diameter twin-screw extruder (L/D=41.5). Simultaneously, dioctyltin dilaurate was fed to the hopper inlet of the twin-screw extruder at a rate of 0.5 [g/min].

Apart from this, dicyclohexylmethane-4,4'-diisocyanate adjusted to 30° C. was fed at a rate of 12.4 [g/min] to the screw barrel section located on the downstream side of the hopper inlet of the twin-screw extruder (R value=0.91), and a reaction was carried out continuously under a nitrogen atmosphere (set at 180° C.). A strand taken out through the outlet of the twin-screw extruder was cooled and then pelletized by a pelletizer to obtain modified polyalkylene oxide.

The resulting modified polyalkylene oxide had a melt viscosity of 150 [Pa·s] and a water absorption ability of 20 [g/g].

Example 1

To a 500-mL four-necked separable flask equipped with a condenser, a nitrogen inlet tube, a thermometer and a stirrer were charged 144 g of isopropyl alcohol and 36 g of water. To the flask was added 20 g of modified polyalkylene oxide that was obtained in the same manner as in Production Example 1. The temperature of the inside of the flask was risen to 60° C. while stirring the resulting mixture to dissolve modified polyalkylene oxide therein, and the solution was cooled to room temperature. The solution thus obtained had a viscosity of 180 [mPa·s].

Onto a part (60 mm×50 mm) of the surface of a substrate (60 mm×50 mm×2 mm) obtained by the injection molding of high impact polystyrene (abbreviated name: HIPS, produced by BASF, type No.: 476L) was applied the resulting solution in an amount of 28 [g/m$^2$] using a brush. The applied solution was dried in the open air to obtain a sheet. The amount of modified polyalkylene oxide contained in the resulting sheet was 2.8 g/m$^2$.

The results of the evaluation of the resulting sheet on abrasion properties are given in Tables 1 and 2.

Example 2

To a 500-mL four-necked separable flask equipped with a condenser, a nitrogen inlet tube, a thermometer and a stirrer were charged 170 g of isopropyl alcohol and 20 g of water. To the flask was added 10 g of modified polyalkylene oxide that was obtained in the same manner as in Production Example 1. The temperature of the inside of the flask was risen to 60° C. while stirring the resulting mixture to dissolve modified polyalkylene oxide therein, and the solution was cooled to room temperature. The solution thus obtained had a viscosity of 70 [mPa·s].

Onto a part (60 mm×50 mm) of the surface of a substrate (60 mm×50 mm×2 mm) obtained by the injection molding of high impact polystyrene (abbreviated name: HIPS, produced by BASF, type No.: 476L) was applied the resulting solution in an amount of 30 [g/m$^2$] using a brush. The applied solution was dried in the open air to obtain a sheet. The amount of modified polyalkylene oxide contained in the resulting sheet was 1.5 g/m$^2$.

The results of the evaluation of the resulting sheet on abrasion properties are given in Tables 1 and 2.

Example 3

To a 500-mL four-necked separable flask equipped with a condenser, a nitrogen inlet tube, a thermometer and a stirrer were charged 110 g of ethanol and 30 g of water. To the flask was added 60 g of modified polyalkylene oxide that was obtained in the same manner as in Production Example 2. The temperature of the inside of the flask was risen to 60° C. while stirring the resulting mixture to dissolve modified polyalkylene oxide therein, and the solution was cooled to room temperature. The solution thus obtained had a viscosity of 320 [mPa·s].

Onto a part (60 mm×50 mm) of the surface of a substrate (60 mm×50 mm×2 mm) obtained by the heat pressing of a polyethylene (abbreviated name: PE, produced by Sumitomo Chemical Co., Ltd., type No.: Sumikathene G801) was applied the resulting solution in an amount of 15 [g/m$^2$] using a brush. The applied solution was dried in the open air to obtain a sheet. The amount of modified polyalkylene oxide contained in the resulting sheet was 4.5 g/m$^2$.

The results of the evaluation of the resulting sheet on abrasion properties are given in Tables 1 and 2.

Example 4

To a 500-mL four-necked separable flask equipped with a condenser, a nitrogen inlet tube, a thermometer and a stirrer were charged 112 g of ethanol and 48 g of water. To the flask was added 40 g of modified polyalkylene oxide that was obtained in the same manner as in Production Example 2. The temperature of the inside of the flask was risen to 60° C. while stirring the resulting mixture to dissolve modified polyalkylene oxide therein, and the solution was cooled to room temperature. The solution thus obtained had a viscosity of 180 [mPa·s].

Onto a part (60 mm×50 mm) of the surface of an SUS plate (60 mm×50 mm×2 mm) was applied the resulting solution in an amount of 12 [g/m$^2$] using a brush. The applied solution was dried for 5 minutes using a hot-air drier set at 40° C. to obtain a sheet. The amount of modified polyalkylene oxide contained in the resulting sheet was 2.4 g/m$^2$.

The results of the evaluation of the resulting sheet on abrasion properties are given in Tables 1 and 2.

Comparative Example 1

To a 500-mL four-necked separable flask equipped with a condenser, a nitrogen inlet tube, a thermometer and a stirrer were charged 170 g of isopropanol and 20 g of water. To the flask was added 10 g of water-soluble polyethylene oxide (produced by Sumitomo Seika Chemicals Co., Ltd., type No.: PEO2, viscosity average molecular weight: 18,000). The temperature of the inside of the flask was risen to 60° C. while stirring the resulting mixture to dissolve polyethylene oxide therein, and the solution was cooled to room temperature. The solution thus obtained had a viscosity of 880 [mPa·s].

Onto a part (60 mm×50 mm) of the surface of a substrate (60 mm×50 mm×2 mm) obtained by the injection molding of high impact polystyrene (abbreviated name: HIPS, produced by BASF, type No.: 476L) was applied the resulting solution in an amount of 30 [g/m$^2$] using a brush. The applied solution was dried in the open air to obtain a sheet. The amount of water-soluble polyethylene oxide contained in the resulting sheet was 1.5 g/m$^2$.

The results of the evaluation of the resulting sheet on abrasion properties are given in Tables 1 and 2.

Comparative Example 2

To a 500-mL four-necked separable flask equipped with a condenser, a nitrogen inlet tube, a thermometer and a stirrer were charged 164 g of isopropyl alcohol and 16 g of water. To the flask was added 20 g of water-soluble polyethylene oxide (produced by Sumitomo Seika Chemicals Co., Ltd., type No.: PEO2, viscosity average molecular weight: 18,000). The temperature of the inside of the flask was risen to 60° C. while stirring the resulting mixture to dissolve polyethylene oxide therein, and the solution was cooled to room temperature. The solution thus obtained had a viscosity of 1430 [mPa·s].

It was tried to apply the resulting solution onto the surface of a substrate (60 mm×50 mm×2 mm) obtained by the injection molding of high impact polystyrene (abbreviated name: HIPS, produced by BASF, type No.: 476L) using a brush. However, a great extent of cobwebbing occurred, and it was not possible to apply the solution. Therefore, any sheet could not be obtained.

TABLE 1

Mean coefficient of friction (MIU)

| | First time | Second time | Third time | Forth time | Fifth time | Sixth time | Flowing water, for 10 minutes | Slimy feeling |
|---|---|---|---|---|---|---|---|---|
| Example 1 | 0.07 | 0.07 | 0.08 | 0.09 | 0.09 | 0.13 | 0.25 | ○ |
| Example 2 | 0.07 | 0.12 | 0.19 | 0.24 | 0.27 | 0.28 | 0.29 | ○ |
| Example 3 | 0.09 | 0.14 | 0.19 | 0.25 | 0.27 | 0.28 | 0.29 | ○ |
| Example 4 | 0.14 | 0.15 | 0.20 | 0.26 | 0.28 | 0.29 | 0.29 | ○ |
| Comparative Example 1 | 0.26 | 0.35 | 0.48 | 0.63 | 0.70 | 0.72 | 0.87 | x |

TABLE 2

Deviation in mean coefficent of friction (MMD)

| | First time | Second time | Third time | Forth time | Fifth time | Sixth time | Flowing water, for 10 minutes |
|---|---|---|---|---|---|---|---|
| Example 1 | 0.010 | 0.011 | 0.013 | 0.012 | 0.013 | 0.012 | 0.014 |
| Example 2 | 0.012 | 0.013 | 0.013 | 0.013 | 0.012 | 0.013 | 0.015 |
| Example 3 | 0.011 | 0.012 | 0.013 | 0.011 | 0.011 | 0.013 | 0.015 |
| Example 4 | 0.012 | 0.013 | 0.012 | 0.014 | 0.015 | 0.014 | 0.015 |
| Comparative Example 1 | 0.010 | 0.030 | 0.080 | 0.015 | 0.016 | 0.018 | 0.018 |

(Slipping Property and Surface Smoothness of Sheets)

Each of the sheets obtained in Examples 1 to 4 showed 0.3 or less of mean coefficient of friction (MIU) in the sixth repeated test, and 0.015 or less of deviation in mean coefficient of friction (MMD).

The sheet obtained in Comparative Example 1, on the other hand, showed 0.72 of mean coefficient of friction (MIU), which was extremely high, in the sixth repeated test, and more than 0.015 of deviation in mean coefficient of friction (MMD).

Thus, the sheets according to the present invention had good slipping properties and good surface smoothness.

(Adhesiveness of Modified Polyalkylene Oxide Layers)

Each of the sheets obtained in Examples 1 to 4 showed 0.3 or less of mean coefficient of friction (MIU) in the 10 minutes experiment under flowing water, and 0.015 or less of deviation in mean coefficient of friction (MMD). In the sheets according to the present invention, both the mean coefficient of friction (MIU) and the deviation in mean coefficient of friction (MMD) are low and, therefore, it can be concluded that the adhesiveness of the modified polyalkylene oxide layers onto the substrates is high.

The sheet obtained in Comparative Example 1, on the other hand, showed 0.87 of mean coefficient of friction (MIU), which was extremely high, in the 10 minutes experiment under flowing water, and more than 0.015 of deviation in mean coefficient of friction (MMD). In the sheet obtained in Comparative Example 1, both the mean coefficient of friction (MIU) and the deviation in mean coefficient of friction (MMD) are high and, therefore, it is considered that the water-soluble polyethylene oxide, which is a lubricant component, was removed by the flow of water and was lost. Thus, it can be concluded that the adhesiveness of the water-soluble polyethylene oxide layer onto the substrate is poor.

(Slimy Feeling)

In the sheets obtained in Examples 1 to 4, no slimy feeling was felt and, therefore, the surfaces of the sheets had good touch feeling.

In the sheet obtained in Comparative Example 1, on the other hand, a slimy feeling was felt.

INDUSTRIAL APPLICABILITY

The sheet according to the present invention can maintain its lubricity even when used repeatedly and have no slimy feeling. Therefore, the sheet can be used optimally and widely in the fields for which lubricity under wet conditions is required, such as wet shaving instruments represented by razors, medical instruments such as catheters, ship bottom paints, and the like.

DESCRIPTION OF SYMBOLS

1 Sheet according to present invention
11 Substrate
12 Layer of modified polyalkylene oxide according to present invention

The invention claimed is:

1. A method for producing a sheet comprising a substrate and a layer of modified polyalkylene oxide formed directly on a surface of the substrate, the method consisting of:
    forming a solution by dissolving a solid modified polyalkylene oxide in a solvent;
    applying the solution onto the surface of the substrate and drying the applied solution to form the layer of modified polyalkylene oxide;
    wherein the solvent is a mixed solvent of an organic solvent and water;
    wherein the organic solvent is an alcohol;
    wherein the organic solvent with water is a mixing ratio of 100 to 1100 parts by mass of the organic solvent per 100 parts by mass of water;
    wherein modified polyalkylene oxide is a reaction product of a polyalkylene oxide compound, a diol compound, and a diisocyanate compound; and
    wherein the substrate is at least one of the group consisting of resins and metals.

2. The method for producing a sheet according to claim 1, wherein the amount of the solvent used in the solution is 150 to 2,500 parts by mass per 100 parts by mass of modified polyalkylene oxide.

3. The method for producing a sheet according to claim 1, wherein the organic solvent is ethanol and/or isopropyl alcohol.

* * * * *